United States Patent
Dias et al.

(10) Patent No.: US 7,890,458 B2
(45) Date of Patent: Feb. 15, 2011

(54) CAPTURING DATABASE WORKLOAD WHILE PRESERVING ORIGINAL TRANSACTIONAL AND CONCURRENCY CHARACTERISTICS FOR REPLAY

(75) Inventors: Karl Dias, Foster City, CA (US); Leonidas Galanis, San Jose, CA (US); Jonathan Klein, Redwood City, CA (US); Venkateshwaran Venkataramani, Sunnyvale, CA (US); Yujun Wang, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 665 days.

(21) Appl. No.: 11/800,239

(22) Filed: May 3, 2007

(65) Prior Publication Data

US 2008/0097961 A1    Apr. 24, 2008

Related U.S. Application Data

(60) Provisional application No. 60/853,271, filed on Oct. 20, 2006.

(51) Int. Cl.
*G06F 7/00* (2006.01)
*G06F 17/00* (2006.01)

(52) U.S. Cl. ...................... 707/610; 709/248
(58) Field of Classification Search .................. 707/20, 707/610, 248
See application file for complete search history.

(56) References Cited

U.S. PATENT DOCUMENTS 5,440,735 A    8/1995   Goldring
5,448,739 A    9/1995   Jacobson
6,041,344 A *  3/2000   Bodamer et al. ............ 709/203

(Continued)

FOREIGN PATENT DOCUMENTS

EP    1 610 238 A2    12/2005

(Continued)

OTHER PUBLICATIONS

"5 Schema Objects" downloaded from the Internet Apr. 12, 2007 <http://oracle-docs.dartmouth.edu/dba-docs/10gdoc/server.101/b10743/schema.htm > pp. 11-14.

(Continued)

*Primary Examiner*—John E Breene
*Assistant Examiner*—Joshua Bullock
(74) *Attorney, Agent, or Firm*—Hickman Palermo Truong & Becker LLP; Christian A. Nicholes

(57) ABSTRACT

A method and apparatus for capturing database system workload and replaying that workload in a database system is provided. According to one aspect, in order to subject a test database system to the same workload to which the production database system actually would be subjected, a database server in the production system captures and records workload that the database server receives from external entities. This captured workload is processed. Processes external to a database server in the test database system send the processed workload to that database server. As a result, the test database system is subjected to the same workload to which the production database system originally was subjected. The foregoing technique permits a database administrator to determine how the production database system will fare if the difference that is present in the test database system is introduced into the production database system.

14 Claims, 2 Drawing Sheets

U.S. PATENT DOCUMENTS

| | | |
|---|---|---|
| 6,094,684 A | 7/2000 | Pallmann |
| 6,145,121 A | 11/2000 | Levy et al. |
| 6,167,405 A | 12/2000 | Rosensteel, Jr. et al. |
| 6,236,997 B1 * | 5/2001 | Bodamer et al. ............ 1/1 |
| 6,253,228 B1 * | 6/2001 | Ferris et al. ............ 709/203 |
| 6,629,313 B1 * | 9/2003 | Rowe et al. ............ 717/136 |
| 6,769,054 B1 * | 7/2004 | Sahin et al. ............ 711/162 |
| 6,775,826 B1 * | 8/2004 | Zahavi et al. ............ 717/128 |
| 6,813,731 B2 * | 11/2004 | Zahavi et al. ............ 714/45 |
| 6,877,095 B1 | 4/2005 | Allen |
| 7,076,480 B2 | 7/2006 | Scardo et al. |
| 7,194,761 B1 | 3/2007 | Champagne |
| 7,415,522 B2 | 8/2008 | Kaluskar et al. |
| 2003/0172091 A1 | 9/2003 | Norcott |
| 2004/0015600 A1 * | 1/2004 | Tiwary et al. ............ 709/234 |
| 2004/0221115 A1 * | 11/2004 | Sahin et al. ............ 711/154 |
| 2005/0038849 A1 | 2/2005 | Kaluskar et al. |
| 2005/0055383 A1 * | 3/2005 | Dias et al. ............ 707/202 |
| 2005/0131879 A1 * | 6/2005 | Ghosh et al. ............ 707/3 |
| 2005/0131881 A1 * | 6/2005 | Ghosh et al. ............ 707/3 |
| 2005/0186975 A1 | 8/2005 | Yach et al. |

FOREIGN PATENT DOCUMENTS

| | | |
|---|---|---|
| WO | WO 03/005202 A1 | 1/2003 |
| WO | WO 03/009139 A1 | 1/2003 |
| WO | WO 02/097664 A1 | 12/2005 |

OTHER PUBLICATIONS

"6 Application Builder Concepts" downloaded from the Internet Apr. 12, 2007 <http://oracle-docs.dartmouth.edu/dba-docs/10gdoc/appdev.101/b10992/mvl_fund.htm > p. 11.

Dias, K., et al., "Automatic Performance Diagnosis and Tuning in Oracle", XP-002470748, CIDR Conference, 2005, 12 pages.

European Patent Office, "International Search Report", PCT/US2007/081966, dated Mar. 11, 2008, 14 pages.

Claims, PCT/US2007/081966, 6 pages.

\* cited by examiner

CAPTURING DATABASE WORKLOAD WHILE PRESERVING ORIGINAL TRANSACTIONAL AND CONCURRENCY CHARACTERISTICS FOR REPLAY

CLAIM OF PRIORITY

The present application incorporates by reference, and claims domestic priority under 35 U.S.C. §119(e) to, U.S. Provisional Patent Application No. 60/853,271, which is titled "DATABASE WORKLOAD CAPTURE AND REPLAY ARCHITECTURE" and was filed on Oct. 20, 2006.

FIELD OF THE INVENTION

The present invention relates to databases, and in particular, to capturing database system workload and replaying that workload in a database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large business-critical applications are complex and experience highly varying load and usage patterns. These applications are expected to provide certain service guarantees in terms of response time, throughput, uptime, and availability. At times, it may be desirable to change a system that includes such applications. Such a change might involve upgrading the system's database or modifying a configuration, for example. However, before any change is made to a production system, extensive testing and validation should be performed in a test system. In order to be confident that a change will not cause problems (e.g., errors or performance issues) in the production system once that change is introduced into the production system, a system tester should try to expose the test system to a workload that is very similar to the workload that the production system would actually experience in a real world environment.

Previous testing approaches have been inadequate because none of these previous testing approaches has been able to replicate a real production workload in a test system. According to one approach, a set of test scripts is written to test commonly executed code paths. Although this approach can be useful for performing regression testing and functional testing, this approach does not mimic a production workload. This approach usually stresses the testing system only to a very minimal extent.

Under another approach, human users are asked to use the test system as though the test system were a production system. However, this approach is very random and non-deterministic. This approach often fails to reproduce the load patterns that would be experienced in an actual production environment.

What is needed is a technique that exposes a testing system to the same workload to which the production system actually would be exposed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus is described for processing path-based database operations. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

According to one embodiment of the invention, a test database system (referred to herein as the "test system") is subjected to the same workload to which a production database system (referred to herein as the "production system") would be subjected. To subject the test system to the same workload to which the production system would be subjected, a database server in the production system (a "production database server") captures and records workload that the production database server receives from external entities. This captured workload is then processed by the test relational database system, potentially in a non-real-time, out-of-line manner.

In one embodiment, one or more processes external to a database server in the test system (a "test database server") send the processed workload to the test database server. The test database server executes the workload. As a result, the test system is subjected to the same workload to which the production system was originally subjected.

In one embodiment, both the test database server and the production database server are relational database servers. However, the techniques described herein may be applied to test the effect of changes in other types of database systems.

The foregoing technique permits a database administrator or other user to (a) introduce a difference to the test system, and then (b) perform a real-world workload using the test system to determine how the production system will fare if the same difference is introduced into the production system.

Workload Capture and Replay System

Figure 1:
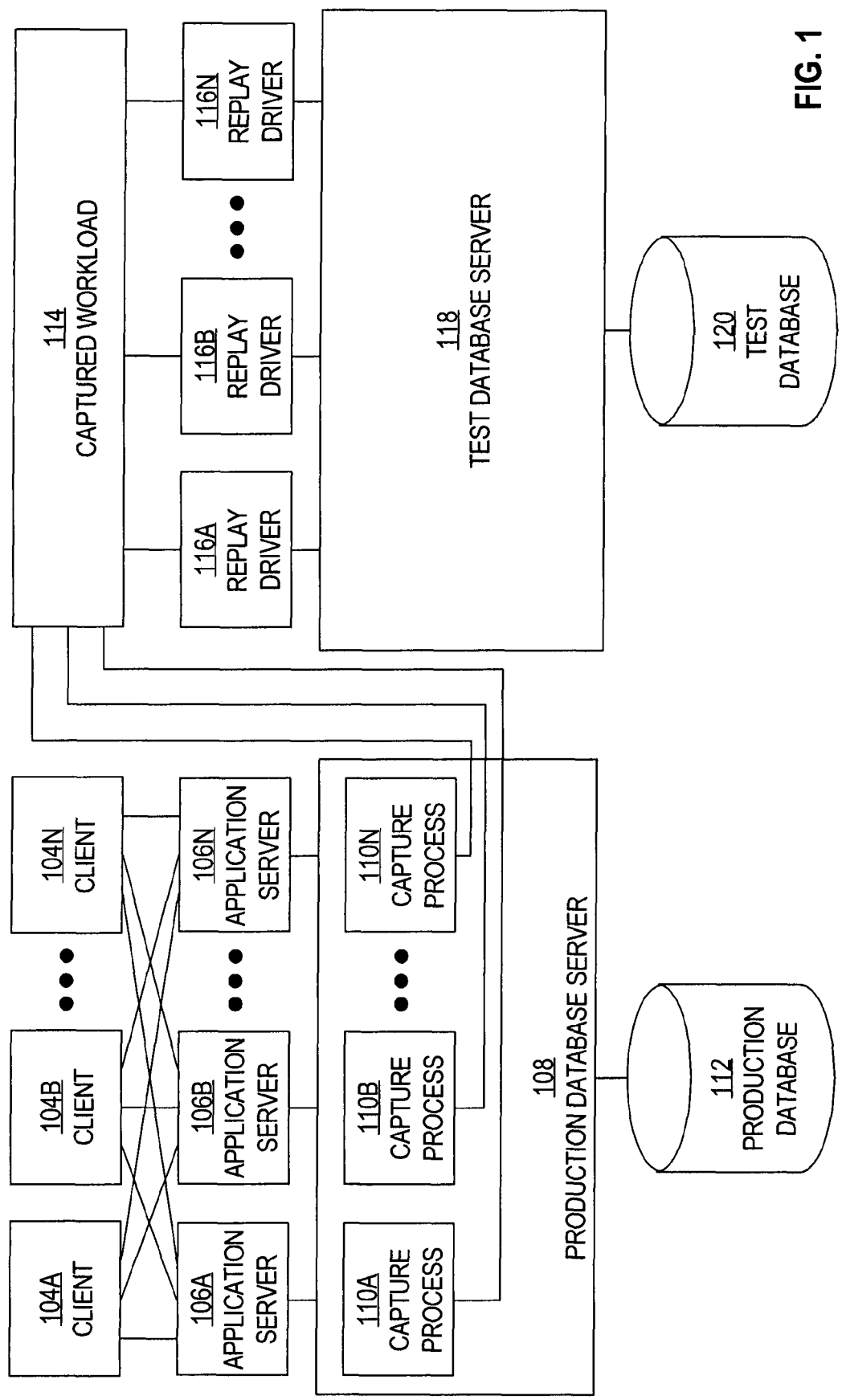
FIG. 1 is a block diagram that shows an example of a system in which workload that is submitted to a production database server is captured and replayed to a test database server, according to an embodiment of the invention.

FIG. 1 is a block diagram that shows an example of a system in which workload that is submitted to a production database server is captured and replayed to a test database server, according to an embodiment of the invention. The example shown includes clients 104A-N, application servers 106A-N, a production database server 108, a production database 112, captured workload 114, replay drivers 116A-N, test database server 118, and test database 120. Production database server 108 includes capture processes 110A-N.

Clients 104A-N may be separate computers or separate processes that execute on the same computer. For example, in one embodiment of the invention, clients 104A-N are Internet browsers (e.g., Mozilla Firefox) that execute on separate computers that are communicatively coupled to the Internet. In one embodiment of the invention, clients 104A-N send requests to, and receive responses from, application servers 106A-N over the Internet.

Application servers 106A-N may be separate computers or separate processes that execute on the same computer. For example, in one embodiment of the invention, application servers 106A-N are web server-invoked processes that execute on separate servers that are communicatively coupled to the Internet. In one embodiment of the invention, application servers 106A-N receive requests from, and send responses to, clients 104A-N over the Internet. Each of application servers 106A-N may implement different functionality for responding to different types of requests from clients 104A-N.

In servicing requests from clients 104A-N, application servers 106A-N might need to retrieve data from and/or store data to a database. To accomplish this, in one embodiment of the invention, application servers 106A-N establish database sessions with production database server 108. Within these sessions, application servers 106A-N send database commands to production database server 108. Such database commands may include Structured Query Language (SQL) select statements, for example.

Production database server 108 executes these database commands relative to production database 112. As a result of the executing these database commands, production database server 108 may store data in, and/or retrieve data from, production database 112. Production database server 108 may execute two or more database commands in a transactional manner, so that none of the effects of the database commands in a single transaction are made permanent in production database 112 unless all of the effects of those database commands can be made permanent. Production database server 108 may return, to application servers 106A-N, data retrieved from production database 112 as a result of the execution of certain database commands (e.g., SQL select statements). Applications servers 106A-N may use such retrieved data in forming responses to clients 104A-N.

In one embodiment of the invention, production database server 108 includes capture processes 110A-N. Capture processes 110A-N may be implemented as separate concurrently executing processes or as concurrently executing threads of the same process, for example. In one embodiment of the invention, capture processes 110A-N collectively, transparently, and non-intrusively capture all workload that production database server 108 receives from external entities (e.g., application servers 106A-N and/or clients 104A-N).

As used herein, the term "workload" refers to discrete, independently meaningful units called "workload units". In one embodiment of the invention, each "workload unit" corresponds to a separate "user request" (e.g., a request originating from (a) one of clients 104A-N, (b) one of application servers 106A-N, or (c) some other process that is external to production database server 108).

Capture processes 110A-N store and record this workload as captured workload 114. As a result, captured workload 114 may comprise workload that was captured during a specified interval of time, referred to herein as the "recording interval". In one embodiment of the invention, captured workload 114 represents actual real-world use of production database server 108, which use is not specifically for any testing purpose.

In one embodiment of the invention, capture processes 110A-N initially write captured workload to in-memory buffers. Data stored in these in-memory buffers is compressed and written out in batches to persistent storage. Because an I/O transaction involving persistent storage does not need to be performed after the capture of every individual workload unit, the impact of the workload capture on the performance of production database server 108 is reduced.

After capture processes 110A-N have stored workload in captured workload 114, captured workload 114 may undergo automated processing. This automated processing may be performed in a non-real-time manner. For example, after capture processes 110A-N have finished storing data in captured workload 114, processes external to production database server 108 may process captured workload 114. This processing may be performed while production database server 108 services further requests from application servers 106A-N. Thus, the processing of captured workload 114 may be performed without any interference with or impact on the operations of production database server 108.

In one embodiment of the invention, after captured workload 114 has undergone processing as discussed above, replay drivers 116A-N read the processed workload from captured workload 114 and send that processed workload to test database server 118. Replay drivers 116A-N may be implemented as separate concurrently executing processes or as concurrently executing threads of the same process, for example. In sending the processed workload to test database server 118, replay drivers 116A-N subject test database server 118 to the same workload to which clients 104A-N and/or application servers 106A-N subjected production database server 108 during the recording interval.

In one embodiment of the invention, replay drivers 116A-N synchronize the sending of workload units that they send to test database server 118 so that the differences in time between the test database server's receipt of those workload units corresponds to the differences in time between the production database server's previous receipt of those same workload units during the recording interval. Thus, in one embodiment of the invention, the duration of the interval of time during which replay drivers 116A-N send workload to test database server 118 is identical to the duration of the interval of time during which clients 104A-N and/or application servers 106A-N sent that same workload to production database server 108. In one embodiment of the invention, replay drivers 116A-N replay workload to test database server 118 in a manner that preserves all transactional dependencies that exist between transactions that are stored in captured workload 114.

In one embodiment of the invention, each of replay drivers 116A-N can replay workload that was captured by multiple separate capture processes 110A-N. Therefore, in one embodiment of the invention, there may be fewer replay drivers 116A-N than capture processes 110A-N. Each of replay drivers 116A-N may be multi-threaded.

Test database server 118 may be different in one or more respects from production database server 108. For example, test database server 118 might be an upgraded version of production database server 108. For another example, test database server 118 might be the same brand and version of production database server 108, but test database server 118 might be configured differently (e.g., in one or more settings) from production database server 108. For yet another example, test database server 118 might be an entirely different brand of database server from production database server 108. Test database server 118 might execute on a machine that has different hardware than the hardware of the machine on which production database server 108 executes. Test database server 118 might execute in conjunction with a different operating system than the operating system in conjunction with which production database server 108 executes. The purpose of subjecting test database server 118 to the same workload as that to which production database server 108 was actually subjected may be to determine whether the difference between test database server 118 and production database server 108, and/or the difference in the environments in which those database servers execute, is a permissible or desirable difference.

Test database server 118 processes the workload that test database server 118 receives from replay drivers 116A-N. If the workload comprises database commands, then test database server 118 executes the database commands relative to test database 120. As a result of the executing these database commands, test database server 118 may store data in, and/or retrieve data from, test database 120. Test database server 118 may execute two or more database commands in a transactional manner, so that none of the effects of the database commands in a single transaction are made permanent in test database 120 unless all of the effects of those database commands can be made permanent. Test database server 118 may return, to replay drivers 116A-N, data retrieved from test database 120 as a result of the execution of certain database commands (e.g., SQL select statements).

In the embodiment of the invention illustrated in FIG. 1, there is one instance of the production database server and one instance of the test database server. However, in alternative embodiments of the invention, there may be multiple production database server instances, all of which perform database operations relative to production database 112. Additionally, in alternative embodiments of the invention, there may be multiple test database server instances, all of which perform database operations relative to test database 120. In one embodiment of the invention, the number of production database server instances differs from the number of test database server instances.

Test database 120 may be different in one or more respects from production database 112. For example, the manner in which logical relational database structures are physically laid out and stored on disk in test database 120 might differ from the manner in such logical relational database structures are physically laid out and stored on disk in production database 112. Thus, although the values present in the data that is stored in production database 112 will be the same as the values present in the data that is stored in test database 120, the manner in which those values are stored on disk may differ between the two databases. Additionally, the manner in which relational tables are partitioned in test database server 120 may differ from the manner in which corresponding relational tables are partitioned in production database 112. Additionally, indices that are (or are not) constructed for relational tables in test database 120 may differ from indices that are (or are not) constructed for corresponding relational tables in production database 112. The purpose of subjecting test database server 118 to the same workload as that to which production database server 108 actually was subjected may be to determine whether the difference between test database 120 and production database 112 is a permissible or desirable difference. Typically, test database 120 is not merely a backup, mirror, or fail-over of production database 112.

The recording interval may begin at a time at which production database 112 is already in a certain state. For example, at the time that the recording interval begins, production database 112 might already contain one or more logical data structures (e.g., database tables, stored procedures, triggers, views, indices, etc.) which might already be populated with data. If test database 120 does not also contain these structures by the time that replay drivers 116A-N begin to "replay" captured workload 114 to test database server 118, then the execution of database commands within the replayed workload relative to test database 120 might produce errors. Therefore, in one embodiment of the invention, before replay drivers 116A-N begin to replay captured workload 114 to test database server 118, test database 120 is placed in the same logical state as production database 108. This may be accomplished by "backing up" production database 112 and performing a restore, from the resulting backup data, to test database 120, for example. In one embodiment of the invention, such a back up is performed at or shortly prior to the time that the original workload is going to be received at the production database 112. This essentially captures the pre-workload state of production database 112. Consequently, when the backup data is restored relative to test database 120, the state of test database 120 is highly similar to the state in which production database 112 existed prior to the receipt of the original workload.

The time interval during which replay drivers 116A-N replay captured workload 114 to test database server 118 may be completely non-overlapping and non-concurrent with the time interval during which capture processes 110A-N intercept and store that workload. For example, capture processes 110A-N might intercept and record captured workload 114 during a first time interval. Hours, days, or even weeks after the end of that first time interval, replay drivers 116A-N might replay captured workload 114 to test database server 118 during a second time interval that is not concurrent with any part of the first time interval.

Beneficially, in one embodiment of the invention, clients 104A-N and application servers 106A-N are not needed to replay captured workload 114 to test database server 118. Because replay drivers 116A-N handle the replaying of captured workload 114 to test database server 118, there is no need to duplicate clients 104A-N or application server 106A-N in the replay system. This advantageously saves resources.

Kinds of Workload Captured

As is discussed above, in one embodiment of the invention, capture processes 110A-N intercept and capture workload that production database server 108 receives from entities that are external to production database server 108, and replay drivers 116A-N read and replay captured workload 114 to test database server 118. In one embodiment of the invention, capture processes 110A-N are implemented within and as a part of production database server 108. For example, capture processes 110A-N may be implemented as commands within the source code of production database server 108. As a part of production database server 108, capture processes 110A-N are privy to all of the information to which production database server 108 is privy. In such an embodiment, the code of production database server 108 comprises functionality that inspects workload at various points in the processing of that workload. Such code may capture actual content within the received workload and/or data that is derived from the production database server's processing (e.g., execution) of that content. In one embodiment of the invention, the information that capture processes 110A-N intercept and store in captured workload 114 includes information that is sufficient to allow a transactionally consistent replay of the captured workload to be performed relative to a replay/test system (i.e., test database server 118 and test database 120). Such information allows the replay database system to be subjected to a workload that is practically indistinguishable from the workload to which the production system was originally subjected. A description of the kinds of workload and information that capture processes 110A-N intercept and capture and which replay drivers read and replay (in one embodiment of the invention) is now described.

In one embodiment of the invention, the captured workload includes five main kinds of information: SQL and PL/SQL workload, non-SQL workload, transactional data, call (workload unit) context, and special function instrumentation. However, in various alternative embodiments of the invention, workload may include additional, fewer, or different kinds of data than those expressly described herein. In one embodiment of the invention, the captured workload includes all operations that are to be performed on data in production database 112. In one embodiment of the invention, the captured workload includes all data that production database server 108 receives from entities that are external to production database server 108, but in alternative embodiments of the invention, workload may exclude some of this data.

In one embodiment of the invention, SQL and PL/SQL workload includes SQL statement text, SQL statement arguments (e.g., bind values), and miscellaneous environment attributes that are set by clients (e.g., clients 104A-N and application servers 106A-N). These environment attributes may include Oracle Call Interface ("OCI") attributes that affect server performance, such as row pre-fetching. OCI is a set of low-level application programming interface ("API") calls that client and application programs may use to interact with Oracle databases. OCI allows a program to use operations such as logon, execute, parse, fetch, etc. In one embodiment of the invention, in addition to the kinds of information described above, capture processes 110A-N also capture some performance data in order to facilitate a comparison between the performance of production database server 108 when the workload was being captured and the performance of test database server 118 when the workload will be replayed. Such performance data may include, for example, errors, row counts, elapsed time, and time model statistics.

In one embodiment of the invention, capture processes 110A-N only capture SQL statements that originate externally to production database server 108. In one embodiment of the invention, capture processes 110A-N do not capture SQL statements that originate from within production database server 108. Some SQL statements that production database server 108 receives from entities external to production database server 108 may cause mechanisms within production database server 108 to create further SQL statements. In one embodiment of the invention, capture processes 110A-N do not capture these latter SQL statements that are created by mechanisms within production database server 108.

In one embodiment of the invention, workload includes each SQL statement that production database server 108 receives from external entities. In one embodiment of the invention, capture processes 110A-N establish a mapping between each such SQL statement and that SQL statement's corresponding cursor number. A cursor number is a SQL statement identifier that exists and is used within production database server 108. In one embodiment of the invention, workload includes this cursor number, which may be used in order to facilitate replay of the SQL statements. In one embodiment of the invention, during the recording interval, a cursor number may be associated with a particular SQL statement after that statement has been optimized in the capture system. If the same particular SQL statement is repeated during the recording interval, and if the cursor has not been closed, then the cursor number may be used to refer to the already-optimized statement instead of re-optimizing the SQL statement. In one embodiment of the invention, whenever a SQL statement becomes associated with a cursor number during the recording interval, capture processes 110A-N store, in captured workload 114, a mapping between the cursor number and the SQL statement. In one embodiment of the invention, when production database server 108 receives a SQL statement for which there is an already-open cursor, the cursor number of this cursor, rather than the entire SQL statement, is captured and stored in captured workload 114. As a result, captured workload 114 is more compact and consumes less space. Because the cursor numbers are stored in captured workload 114, along with a mapping between those cursor numbers and the SQL statements to which those cursor numbers refer, the replay system may use the cursor numbers at replay time to determine and replay the SQL statements that are associated with those cursor numbers.

In one embodiment of the invention, workload includes the various operations that can be performed as a result of each SQL or PL/SQL statement that production database server 108 receives. In one embodiment of the invention, these operations include parse, execute, cursor fetch, and cursor close. Parsing is the compilation of the statement, and includes optimization. Execution is the actual execution of the statement. If the statement is a query, then a cursor for the query may be created and opened. Cursor fetch gets the next result for the query. Cursor close closes an open cursor, precluding any further fetching from that cursor. In one embodiment of the invention, production database server 108 (and, more specifically, capture processes 110A-N) determines a type (e.g., parse, execute, fetch, etc.) of each request or command that is received by the production database server. The type is stored in captured workload 114.

Each SQL and PL/SQL statement can contain place holders that accept parameters from applications. For example, in the statement "select empname from emp where id=:v1," v1 is a bind variable that is set (or "bound") by an application. In one embodiment of the invention, workload includes all of these "binds" that are performed during execution of SQL statements that production database server 108 receives. Thus, in one embodiment of the invention, production database server 108 (and, more specifically, capture processes 110A-N) store, in captured workload 114, bind values that are specified in SQL statements that the production database server receives. In one embodiment of the invention, there are two types of binds: in-binds and out-binds. In one embodiment of the invention, workload includes all in-binds and selected out-binds. More specifically, in one embodiment of the invention, the only out-binds that are captured as part of the workload are those out-binds that specially bind values, such as ROWIDs and large object (LOB) locators. In one embodiment of the invention, this data is used for remapping during replay. Remapping is discussed in greater detail below in the section titled "REPLAY REMAPPING."

When executed, SQL SELECT statements may cause production database server 108 to return, to the originators of the statements, values that satisfy the criteria specified in the statements. In one embodiment of the invention, the captured workload includes selected values that are returned as a result of the execution of SQL SELECT statements. Specifically, in one embodiment of the invention, workload includes ROWIDs and LOB locators that correspond to such values. In one embodiment of the invention, this data is used for remapping during replay.

In one embodiment of the invention, workload includes non-SQL workload such as session operations, PL/SQL remote procedure calls, and all data that is necessary to recreate certain large object (LOB) workload OCI calls. In one embodiment of the invention, for each session that is established with production database server 108, the captured workload includes that session's user name, the NLS environment, and all session attributes that are needed to recreate session operations such as authentication, logon, logoff, and session switch. In one embodiment of the invention, along with other information that is captured in conjunction with a session login operation, the captured workload includes session connection identifiers. These session connection identifiers may be used during replay to define connections. In one embodiment of the invention, each time that an entity logs into or logs out from production database server 108, capture processes 110A-N capture and store these logins and logouts, and the parameters and attributes thereof, in captured workload 114.

In one embodiment of the invention, the captured workload includes the method names of methods that are invoked inside production database server 108 via PL/SQL remote procedure calls (RPCs). In one embodiment of the invention, the captured workload includes the parameters that are passed to such methods.

OCI has functionality that allows the manipulation of large objects inside of a database. These large objects are identified by LOB locators. In one embodiment of the invention, capture processes 110A-N capture all of the data that is needed to reproduce OCI LOB calls.

In one embodiment of the invention, the captured workload includes transactional data that may be used to facilitate synchronized replay. For example, in one embodiment of the invention, the captured workload includes transactional data such as the environment system change number ("SCN") of a workload unit. The environment SCN of a workload unit defines the state of the database that should be "seen" by a statement in that workload unit. Each SCN is a logical time value that expresses a state in time in a relative rather than an absolute sense. In one embodiment of the invention, the captured workload includes transactional data such as the commit SCN of a commit action. A commit SCN denotes a transition from one database state to another database state. In one embodiment of the invention, the captured workload includes transactional data such as a dependent SCN (described in greater detail further below). A dependent SCN permits the outcome of block-level contention between transactions to be determined during capture. In one embodiment of the invention, the captured workload includes transactional data such as transaction boundaries, which indicate the beginning and ending of a transaction.

In one embodiment of the invention, the captured workload includes call context data such as the beginning and ending of each workload unit. In one embodiment of the invention, the captured workload includes, for each workload unit, statistics such as elapsed time and database time. For each workload unit, capture processes 110A-N may store, in captured workload 114, both (a) information that indicates a time at which production database server 108 received that workload unit, and (b) information that indicates an amount of time that passed between the time that the production database server received that workload unit and the time that the production database server began processing, and/or finished processing, that workload unit. Such statistics may be used for reporting purposes.

In one embodiment of the invention, the captured workload includes the return values of special functions that should be emulated during replay. For example, in one embodiment of the invention, the captured workload includes values returned by function NEXTVAL of a sequence. For another example, in one embodiment of the invention, the captured workload includes values returned by function CURRVAL of a sequence. For yet another example, in one embodiment of the invention, the captured workload includes unique server-generated identifiers, such as those that are generated by the SYS_GUID function. For another example, in one embodiment of the invention, the captured workload includes values that are returned by the SYS_DATE function. For example, in one embodiment of the invention, capture processes 110A-N capture date and time-of-day values that are returned by functions that production database server 108 evaluates. In one embodiment of the invention, capture processes 110A-N capture every value that is generated or returned by the functions discussed above.

In one embodiment of the invention, the captured workload additionally includes database link activity, JAVA Sockets activity, and data that results from the interaction of production database server 108 with other systems.

Capture Mode

In one embodiment of the invention, production database server 108 (and, more specifically, capture processes 110A-N) only captures workload while production database server 108 is configured, by a user, to operate in a "capture mode." For example, a database administrator might place production database server 108 into capture mode via a command communicated through a database administrator interface. In one embodiment of the invention, a database administrator also specifies, through such an interface, a file, location, or other repository into which captured workload 114 should be stored. Capture processes 110A-N store captured workload 114 into the specified repository.

Beneficially, when the capture systems and techniques described herein are used, database server-external processes do not need to be established to perform the capturing tasks. Such external processes might otherwise reduce the stability of the production system (i.e., production database server 108 and production database 112).

Additionally, the capture systems and techniques described herein can be applied to parallel database environments in which multiple production database server instances, which may execute on multiple separate hosts or machines, all serve the same database (e.g., production database 112). In one embodiment of the invention, whenever any production database server instance that serves a particular database is put into capture mode, all of the production database server instances that also serve the particular database are also automatically put into capture mode. Each database server instance records the workload that is received and served by that database server instance.

Because capture processes 110A-N are a part of production database server 108, the database production server 108 itself captures workload. Because production database server 108 is the entity that performs the capturing task (rather than some external entity), the information stored in captured workload 114 is highly accurate. In contrast, capturing workload outside of production database server 108 would be error-prone and subject to inaccuracies; capture entities operating outside of production database server 108 would not have access to all of the information to which production database server 108 has access.

For example, production database server 108 has access to transactional information (e.g., SCNs) to which server-external entities do not necessarily have access. Because such transactional information can be used to ensure a transactionally consistent replay, the capture and replay system described herein can produce a more complete workload capture and replay than other systems that do not have access to transaction information that is typically unavailable outside of a database server.

Additionally, in one embodiment of the invention, because production database server 108 already has interfaces on various different platforms for sophisticated features such as asynchronous I/O, buffered I/O streams, and data compression libraries, the workload capture and replay system described herein is able to benefit from these features to make workload capture highly efficient. Because the workload is captured within a production system that might need to exhibit high performance characteristics even during the recording interval, the workload capture should affect only as minimally as possible the performance of the production system. Therefore, in one embodiment of the invention, captured workload is initially buffered in volatile memory and is not written to disk or other non-volatile memory immediately; frequent disk accesses can negatively impact the performance of the production system. When the in-memory buffer becomes full, then, at that point, the buffer contents are "flushed" to disk or other non-volatile memory. This reduces the frequency of disk accesses. The flushing of the buffer to disk may be performed asynchronously so that the production system can resume with other operations while the flushing takes place rather than waiting for the disk access to complete. The data that is stored to disk or other non-volatile memory may be compressed in order to reduce the amount of storage resources consumed by captured workload 114.

In one embodiment of the invention, because workload is captured internally to production database server 108, the captured workload can be stored in a protocol-agnostic form—the form that the workload assumes after production database server 108 has correctly interpreted the workload. In contrast, if workload were captured externally to production database server 108, then the entities that captured the workload might need to be able to understand a plethora of different, often complex, protocols.

Protocol-Independent, Platform-Independent Capture

Different clients 104A-N and different application servers 106A-N may communicate with production database server 108 using different protocols. Web-based applications often use the Java Database Connectivity ("JDBC") API to send workload to production database server 108. Other applications might use OCI to send workload to production database server 108. Yet other applications might send SQL commands directly to production database server 108.

In one embodiment of the invention, capture processes 110A-N capture workload at a level that is protocol-independent and platform-independent. In other words, in one embodiment of the invention, capture processes 110A-N capture workload in a manner such that regardless of which protocols were used when the workload was originally received at the production system, and regardless of the platform on which the production system was implemented. As a result, the captured workload can be replayed relative to the test system even if the test system requires the workload to be replayed using different protocols, and even if the test system is implemented on a different platform than that on which the production system is implemented.

In one embodiment of the invention, captured workload 114 is stored in a format that is not dependent upon any particular platform (i.e., hardware/operating system combination). Storing the captured workload in a platform-independent form avoids compatibility issues that otherwise might arise due to potential differences in the platforms on which production database server 108 and test database server 118 execute.

Logical-Level Capture

In one embodiment of the invention, because capture processes 110A-N capture workload at a logical level rather than at a physical level, captured workload 114 can be replayed regardless of the types of platforms on which production database server 108 and test database server 118 execute. For example, instead of capturing and storing data in the format that would be written to disk blocks in production database 112 (which would be workload capture at the physical level), capture processes 110A-N may capture and store the actual SQL statements that production database server 108 receives (which is workload capture at the logical level). Thus, according to one embodiment of the invention, capturing workload at a logical level means capturing the workload in the "high level" form in which that workload was received from outside of production database server 108, ignoring any "low-level" peculiarities or formal details involved in the subsequent physical storage of that workload on disk or other non-volatile memory. In one embodiment of the invention, workload is captured immediately after that workload is received from the network layer.

Production database server 108 may be visualized conceptually as comprising multiple stacked layers. The lowest of these layers might be an I/O layer that interfaces with an operating system in the context of which the database server executes. Above this layer might be a data layer. Above the data layer might be a transaction layer that handles transactional semantics. Above the transaction layer might be a SQL layer that processes SQL commands. Workload that is received by production database server 108 may flow downward through these layers. As workload flows downward through the layers, each layer may process the workload in a different way. Data that is produced as a result of the processing of the workload may be passed upward through the layers and processed in different ways at each layer. In one embodiment of the invention, capture processes 110A-N intercept workload as soon as that workload is received by production database server 108, before that workload is processed by any of the conceptual layers discussed above. Thus, the workload is captured at a logical level. Capturing workload at the logical level preserves the integrity of the information that is sent to production database server 108. No relevant information is stripped away; consequently, all relevant information may be considered and accounted for during replay.

The same conceptual layers may be present in test database server 118. When workload is replayed to test database server 118, the conceptual layers of test database server 118 may process the workload in a manner that is similar to the manner in which that workload was previously processed by the layers of production database server 108 during the recording interval. Thus, the same layers that were exercised in production database server 108 during the original processing of the workload may be exercised in test database server 118 when the workload is replayed.

In one embodiment of the invention, although workload is captured at a logical level as near as possible to the point at which production database server 108 receives that workload, additional information (e.g., ROWIDs of relevant rows, server-generated sequence values, etc.) may be captured and stored with the workload as the workload is processed by each layer within production database server 108. Under at least some circumstances, such additional information can be useful during replay to ensure that the replay is a faithful rendition of the original workload. Capture processes 110A-N may capture additional information that is relevant to workload at each layer within production database server 108. Thus, the logical workload may be augmented by such additional information during capture.

Although workload is captured at a logical level, in one embodiment of the invention, captured workload 114 is stored in a binary format that is more compact than the original format in which the workload was received at production database server 108. Because captured workload 114 is stored in a compact format, large quantities of information can be read in fewer I/O accesses, making possible the replay of the information to test database server 118 at no less than the rate at which the information was originally received at production database server 108.

Capture Filters

In one embodiment of the invention, capture processes 110A-N are optionally configurable to "filter" the workload that is stored in captured workload 114 so that only certain user-specified kinds of workload (e.g., only workload whose attributes and characteristics satisfy specified filter criteria) are stored in captured workload 114. For example, capture processes 110A-N may be configured to capture only workload that originates from a selected subset of clients 104A-N. For another example, capture processes 110A-N may be configured to capture only workload that originates from a selected subset of application servers 106A-N. For yet another example, capture processes 110A-N may be configured to capture only workload that targets or applies to a selected subset of relational structures (e.g., relational tables) within production database 112.

Pre-Processing Captured Workload Prior to Replay

In one embodiment of the invention, after capture processes 110A-N have captured workload, but before captured workload 114 can be replayed to test database server 118, various dependencies in captured workload 114 might need to be discovered. For example, transactional dependencies and data dependencies might need to be discovered. In one embodiment of the invention, before captured workload 114 is replayed to test database server 118, data structures that represent these dependencies are generated within captured workload 114. In one embodiment of the invention, the pre-processing that involves the generation of these structures is performed "off-line" relative to the capture and replay processes.

In one embodiment of the invention, the information that is placed within these structures indicates the order in which the various files of captured workload 114 need to be replayed. In one embodiment of the invention, the information that is placed within these structures includes a dependency graph that indicates the order in which sets of workload units should be replayed in order to duplicate the workload that production database server 108 received during the recording interval. In one embodiment of the invention, connection strings that application servers 106A-N used to connect to production database server 108 during the recording interval are placed within these structures so that replay drivers 116A-N can re-create these connections relative to test database server 118 during replay time.

Beneficially, in one embodiment of the invention, once captured workload 114 has been pre-processed as described above, processed captured workload 114 can be replayed multiple times, relative to different database systems, without recapturing the workload represented therein, and without re-processing the workload as described above.

Replay Mode

In one embodiment of the invention, test database server 118 uses at least some of the additional information (e.g., SCNs, server-generated values, etc.) contained in captured workload 114 to perform operations relative to test database 120. In one embodiment of the invention, test database server 118 is configurable to operate in a special non-normal mode called "replay mode." In one embodiment of the invention, while test database server 118 is in replay mode, instead of generating its own SCNs and server-generated values for use in performing operations relative to test database 120, test database server 118 uses the SCNs and server-generated values that are associated with the workload units in captured workload 114. Among other uses, test database server 118 uses this information to coordinate separate transactions that are specified in captured workload 114.

In one embodiment of the invention, while test database server 118 is in replay mode, test database server 118 reads the additional information (e.g., SCNs, server-generated values, etc.) directly from captured workload 114. In such an embodiment of the invention, test database server 118 does not need to obtain this additional information from replay drivers 116A-N, and replay drivers 116A-N do not need to send this additional information to test database server 118. In such an embodiment of the invention, replay drivers 116A-N may send, to test database server 118, workload that only specifies as much information as was present in the workload that production database server 108 originally received, prior to processing any of that workload. However, even in such an embodiment of the invention, replay drivers 116A-N may retain the responsibility of ensuring that the intervals of time that pass between the times that specific workload units are sent to test database server 118 are the same as the intervals of time that passed between the times that those workload units were received by production database server 108 at capture time.

Placing the burden of transaction coordination on test database server 118 instead of replay drivers 116A-N allows a "thinner" implementation of replay drivers 116A-N, in one embodiment of the invention.

In one embodiment of the invention, each of replay drivers 116A-N is responsible for replaying a separate subset of captured workload 114 to test database server 118. In such an embodiment of the invention, replay drivers 116A-N are responsible for properly ordering and timing the sending of the workload units that are in the subsets for which they are responsible, but replay drivers 116A-N are not responsible for properly ordering and timing the sending of any workload units that are in any subsets for which they are not responsible. Global coordination between workload that different replay drivers 116A-N send may be handled by test database server 118 while test database server 118 is in replay mode.

Replay Timing

In one embodiment of the invention, whenever capture processes 110A-N intercept a workload unit that production database server 108 received, capture processes 110A-N record the time at which production database server 108 received that workload unit. Capture processes store a timestamp, which indicates this time, in association with the workload unit in captured workload 114.

In one embodiment of the invention, during workload replay, whenever replay drivers 116A-N read, from captured workload 114, a particular workload unit that is associated with a timestamp, replay drivers 116A-N determine the difference between (a) the time indicated by that timestamp and (b) the time indicated by the timestamp that is associated with the workload unit that replay drivers 116A-N most recently sent to test database server 118. Replay drivers 116A-N wait to send the particular workload unit to test database server 118 until a time represented by the difference has passed since the time that replay drivers 116A-N sent the most recently sent workload unit to test database server 118.

Thus, in one embodiment of the invention, the amount of time that passes between the production database server's receipt of consecutively received workload units determines the amount of time that will pass between the test database server's receipt of those workload units. For example, if production database server 108 receives a first workload unit and then receives a second workload unit two minutes later, then, when replay drivers 116A-N replay the first and second workload units to test database server 118, test database server 118 also will receive the second workload unit two minutes after receiving the first workload unit.

In one embodiment of the invention, replay drivers 116A-N can be configured, optionally, to ignore the timing information that is presented in captured workload 114. When this timing information is ignored, replay drivers 116A-N replay captured workload 114 to test database server 118 as rapidly as possible.

In one embodiment of the invention, there are three separate replay modes from which a user can choose for replaying captured workload 114 to test database server 118. As is discussed above, in one mode, the workload units are replayed at the same time intervals, relative to each other, as they were originally "played" or received at capture time. Also as is discussed above, in one mode, the workload units are replayed as fast as possible, without regard to any time that passed between the original receiving of those workload units at capture time. In a third mode, called "auto replay" mode, replay drivers 116A-N seek to honor and replicate the inter-workload unit time intervals, similar to the first mode described above, but also allow inter-workload unit replay time intervals to be shortened when the replay of previous workload units has taken longer than the original "play" or receipt of those workload units took during capture time. In a sense, this "auto replay" mode allows replay drivers 116A-N to "catch up" when the replay of some workload units has taken longer than expected. For example, at capture time, a first workload unit might be received at production database server 108, and then a second workload unit might be received a minute later, and then a third workload might be received a minute after that. Continuing the example, at replay time, the first workload unit might take a minute and thirty seconds to be processed—longer than the expected minute. Under such circumstances, replay drivers 116A-N might replay the second workload unit one minute and thirty seconds after the replaying of the first workload unit. However, rather than waiting an additional minute after the replaying of the second workload unit to replay the third workload unit, replay drivers 116A-N might "catch up" by replaying the third workload unit only thirty seconds after the replaying of the second workload unit. As a result, even though the replaying of the second workload unit was delayed, the third workload unit will still be replayed two minutes after the first workload unit, similar to the timing that occurred at capture time.

In one embodiment of the invention, replay drivers 116A-N can be configured to replay workload units to test database server 118 at various user-specified speeds. In one embodiment of the invention, the "default" rate or speed at which replay drivers 116A-N replay workload units is based on the rate or speed at which those workload units were originally received at production database server 108. However, in one embodiment of the invention, a replay administrator can change (a) the duration of the time intervals between the replaying of workload units from a same database connection and/or (b) the amount of time that passes when a new database connection is established. Thus, in one embodiment of the invention, a replay administrator can selectively accelerate or decelerate the replay to be faster or slower than the rate or speed at which the workload units originally were processed in the production system at capture-time.

Monitoring and Reporting

In one embodiment of the invention, the system described above with reference to FIG. 1 also includes a monitoring process. The monitoring process allows a user to monitor the capture and/or replay of workload. For example, the monitoring process may present, to a user, real-time performance information (e.g., response time) pertaining to the processing of the workload during capture and/or replay. Such performance information might indicate, for example, that execution of a particular set of SQL statements took 5 seconds in the production system during capture, but 7 seconds in the test system during replay.

For another example, the monitoring process may present, to a user, real-time information that indicates errors that were encountered during capture and/or replay. A user might use such information to determine whether the same errors that occurred when the workload was processed in the production system also occurred when the workload was processed in the test system.

For another example, the monitoring process may present, to a user, statistics pertaining to the data that resulted from the execution of the same workload in the production and test systems. Such statistics might indicate, for example, that a particular SELECT statement, when executed in the production system, caused 10 rows to be returned, but that when executed in the test system, the same SELECT statement caused 12 rows to be returned. Such statistics might indicate, for another example, that a particular UPDATE statement, when executed in the production system, affected 10 rows, but that when executed in the test system, the same UPDATE statement affected 12 rows. Thus, such statistics may be used to detect "data divergence" between the production and test systems.

In one embodiment of the invention, at the conclusion of the replay process, the monitoring process outputs (e.g., to a file) reporting information that indicates differences between the processing of the workload in the production system and the processing of that workload in the test system. In one embodiment of the invention, monitoring and reporting is performed at the workload unit level. Thus, a user may see fine-grained performance information, errors, and statistics relating to specific user-selected sets of workload units (e.g., SQL commands) in which the user is particularly interested. A database administrator may use this fine-grained information to determine whether to introduce, into the production system, a particular change that is present in the test system but not in the production system.

Replay Remapping

The correct replay of captured workload 114 relative to test database server 118 can depend on various aspects of the production system and the capture process. Some of these aspects include the physical layout of the data in production database 112, the specific implementation of production database server 108, the time of day at which the recording interval occurred, non-transactional concurrency-enabling identifiers (e.g., server-generated sequence values), and external system interfaces. Each of these aspects is separately discussed below.

An implicit column in each relational table stores the ROWID for each row in that table. Applications 106A-N might use ROWIDs to quickly access a specific set of rows in a relational table. For example, during the recording interval, application 106A might issue, to production database server 108, an SQL command such as "UPDATE T SET a='Y' WHERE foo.ROWID=:R." The ROWID for ":R" might have been obtained by a previous SELECT statement on table T. Unless some remedial action is taken, when such an SQL command is replayed relative to test database server 118, the captured bind value for ":R" might be invalid relative to table T in test database 120. The kinds of issues that exist concerning replayed ROWIDs also exist concerning LOB locators.

The results of some database operations might depend on the implementation of the database system in which those database operations are performed. For example, the value of REF CURSOR (a cursor variable) that is passed into a PL/SQL program is internally a number that depends not only on the implementation of the database system, but also on the number of currently open cursors in the database system. Unless some remedial action is taken, if the captured value of a REF CURSOR is used during replay, then the REF CURSOR might not point to the appropriate result set. The kinds of issues that exist concerning replayed cursor variables also exist concerning session identifiers and serial numbers.

Often, captured workload 14 will be replayed relative to test database server 18 on a different date and at a different time of day than that during which capture processes 110A-N captured the captured workload. Workload that is replayed relative to test database server 118 might depend to some extent on the date and/or the time of day. If a workload replay system does not take such issues into account, then the replay of captured workload 114 relative to test database server 118 might produce incorrect results.

The need for concurrently unique number generators in database systems has led to the concept of a sequence. Application threads that execute concurrently and require unique numbers often use sequence functions such as NEXTVAL and CURRVAL. If captured workload units that contain invocations of such sequence functions are replayed without modification relative to test database server 118, then the invocations of those sequence functions might produce values that are different from the values that those sequence functions produced during capture time.

External system interfaces may differ between a production system, in which workload is captured, and a test system, in which such workload is replayed. For example, connection strings and service names that application servers 106A-N use to connect to production database server 108 might not be suitable for connecting to test database server 118. If a workload replay system does not compensate for this possibility, then workload replay might fail.

To address the issues discussed above, in one embodiment of the invention, components of the replay system (e.g., replay drivers 116A-N and/or test database server 118) modify workload units from captured workload 114 so that those workload units contain parameters that are appropriate for the replay system. Such modification is called "remapping." In one embodiment of the invention, remapping is performed for values such as ROWIDs, cursor numbers, LOB locators, and other values that are system-dependent. In one embodiment of the invention, remapping is performed for values such as sequence numbers and other identifiers that are generated by a database server.

In one embodiment of the invention, components of the workload capture system (e.g., capture processes 110A-N) capture not only workload units that production database server 108 receives, but also selected data that production database server 108 generates while processing those workload units, including certain values that production database server 108 returns to the originators of those workload units (e.g., applications servers 106A-N and clients 104A-N).

In one embodiment of the invention, remapping involves three techniques: match-based remapping, replay-time emulation, and user-defined substitutions. Each technique is discussed below.

Match-Based Remapping

In one embodiment of the invention, at capture time, capture processes 110A-N determine, for each workload unit that is processed by production database server 108, whether the processing of that workload unit causes production database server 108 to return system-dependent values to any entity that is external to production database server 108 (e.g., application servers 106A-N or clients 104A-N). System-dependent values include ROWIDs, LOB locators, and REF CURSORs. For example, a SQL SELECT command might cause the value of the ROWID column in a particular row of a specified table to be returned. If the processing of a workload unit causes production database server 108 to return any system-dependent value, then capture processes 110A-N store, in captured workload 114, the returned system-dependent "capture-time" value. Capture processes 110A-N create an association, in captured workload 114, between this value and the workload unit whose processing caused the value to be returned.

In one embodiment of the invention, whenever the processing of a workload unit causes production database server 108 to bind a variable to a system-dependent value, capture processes 110A-N also store this binding in captured workload 114 in association with the workload unit whose processing caused the value to be bound to the variable.

In such an embodiment of the invention, at replay time, components of the replay system use the system-dependent value associated with workload units in captured workload 114 to replace instances of variables that were bound to the capture-time system-dependent values with appropriate replay-time system-dependent values that correspond to the capture-time values but are valid in the context of test database 120 (the capture-time values are valid in the context of production database 112, but are not valid in the context of test database 120). Based on the information in captured workload 114, components of the replay system establish, in a remapping table, mappings between capture-time system-dependent values and corresponding (but different) replay-time system-dependent values that are generated during replay-time. During replay-time, whenever a replay system component determines that a workload unit is associated with (e.g., contains or refers to) a variable that was bound to a capture-time system-dependent value, that replay system component replaces the variable with the replay-time system-dependent value to which the capture-time system-dependent value is mapped in the remapping table.

The replacement is performed before test database server 118 processes the workload unit. "Processing" a workload unit means that a database server executes or otherwise performs the operations that are specified in that workload unit. For example, a database server may process a workload unit by executing a SQL command that is indicated in that workload unit. As a result of the replacement, when test database server 118 processes any workload unit that involves a variable that was bound to a system-dependent value such as a ROWID, test database server 118 processes that workload unit with a "remapped" system-dependent value that is valid in the context of test database 120. Thus, if a replayed workload unit involves a binding between a system-dependent value and a variable, then at replay-time, the variable will be bound to the replay-time system-dependent value that is mapped, in the remapping table, to the capture-time system-dependent value to which the variable was previously bound at capture-time.

For example, capture processes 110A-N might determine, at capture time, that a variable "v1" in a particular SQL statement (the "workload unit") has been bound to a ROWID of "X," which, being a ROWID is a system-dependent value. As a result, capture processes 110A-N might store a binding between variable "v1" and value "X." In captured workload 114, this binding might be associated with the particular SQL statement. At replay time, components of the replay system might establish, in a remapping table, a mapping between capture-time value "X" and a corresponding replay-time value "Y" that is generated during replay-time. Thereafter, during replay-time, whenever a replay system component determines that a SQL statement (workload unit) is associated with variable "v1," that replay system component replaces variable "v1" in the SQL statement with replay-time value "Y," which is mapped to capture-time value "X" in the remapping table. As a result, the SQL statement is replayed using the replay-appropriate value "Y" rather than the replay-inappropriate value "X."

Replay-Time Emulation

Some workload units that production database server 108 receives might specify invocations of database functions that return database server-generated values (i.e., values that the database server generates without regard to any data stored in the database on which the database server operates). For example, in one embodiment of the invention, invocation of the NEXTVAL function returns the value that occurs, in a sequence of values, immediately after the value that was returned by the most recent invocation of the NEXTVAL function in the same session (alternatively, NEXTVAL returns the first value of that sequence if NEXTVAL was not previously invoked in that session). For example, if the most recent invocation of the NEXTVAL function in a particular session returned the value "2," then the next invocation of the NEXTVAL function in that session returns the value "3."

In one embodiment of the invention, in order to ensure that the values returned by such functions are preserved and duplicated when the workload is replayed on test database server 118, whenever capture processes 110A-N determine that an intercepted workload unit specifies an invocation of such a function (e.g., CURRVAL, NEXTVAL, etc.), capture processes 110A-N obtain the actual value that is returned by the invocation of that function. As is discussed above, capture processes 110A-N may be implemented within the code of production database server 108. Thus, in one embodiment of the invention, the production database server code that implements the sequence generation functions (e.g., CURRVAL, NEXTVAL, etc.) comprises functionality that captures and stores the values generated by these functions when these functions are executed.

Capture processes 110A-N store the actual value in association with the workload unit in captured workload 114. In such an embodiment of the invention, during the replay of the workload to test database server 118, test database server 118 modifies workload units that specify an invocation of such a function so that the actual values associated with those workload units replace the invocation of the function. For example, at replay time, a SQL statement (workload unit) that invokes function CURRVAL might be modified by test database server 118 such that, in the modified SQL statement, CURRVAL is replaced by the actual value that the invocation of CURRVAL returned (as indicated in captured workload 114) in the production system at capture time.

As a result, when test database server 118 processes (i.e., executes) the workload unit at replay-time, test database server 118 processes the workload unit with the same values with which production database server 108 processed that workload unit at capture-time.

Although the description above refers specifically to the NEXTVAL function, similar techniques may be used in connection with other database functions that return database server-generated values. For example, in one embodiment of the invention, whenever capture processes 110A-N determine that an intercepted workload unit specifies an invocation of a function that returns the current date and/or time of day, capture processes 110A-N obtain the actual current date and/or time of day that is returned by the invocation of that function. Capture processes 110A-N store the actual current date and/or time of day in association with the workload unit in captured workload 114. In such an embodiment of the invention, during the replay of the workload to test database server 118, test database server 118 modifies workload units that specify an invocation of such a function so that the date and/or time of day associated with those workload units replace the invocation of the function. Thus, even if replay drivers 116A-N replay such a workload unit on a different date and/or at a different time of day than that at which the workload unit was originally captured, the workload unit will reflect the originally captured date and/or time of day rather than the date and/or time of day at which the workload unit is replayed.

User-Defined Substitutions

Typically, when one of application servers 106A-N needs to transact with production database server 108, that application server first needs to establish a connection with production database server 108. In order to establish this connection, the application server usually needs to have and use a specified set of detailed information, such as the identity of the machine on which production database server 108 is executing, the port number that will be used in the connection, the protocol according to which data will be communicated over the connection, etc. Such information is often contained in "connection strings," which are usually embedded somewhere within workload.

Test database server 118 cannot be connected to using the same connection strings that are used to connect to production database server 108. If replay drivers 116A-N replay a workload unit that specifies a connection string that was used to connect to production database server 108, then subsequent workload units that replay drivers 116A-N replay might be directed, unintentionally, to production database server 108 rather than test database server 118.

To prevent this and other similar types of accidents from happening, in one embodiment of the invention, a user can specify a set of capture-time values and a corresponding set of associated replay-time values. In such an embodiment of the invention, a registration component of the replay system receives the user-specified set of capture-time and replay-time values from the user and stores mappings between those values in a registry. In such an embodiment of the invention, whenever any one of replay drivers 116A-N reads, from captured workload 114, a workload unit that contains a value that is in the registered user-specified set of capture-time values, or a variable that was bound to such a value, that replay driver replaces the capture-time value or the variable in the workload unit with the registered user-specified replay-time value that is mapped to that capture-time value. The replay driver then sends the modified workload unit to test database server 118.

Because connection strings can be remapped in the above manner, workload can be captured within a production system that includes a single database server, but replayed within a test system that includes multiple database server instances that all perform operations relative to test database 120 (e.g., as in a Real Application Cluster). This may be accomplished, for example, by remapping all of the connection strings so that replay drivers 116A-N send replayed workload units to a load-balancing service that distributes the workload units among the multiple database server instances in the test system.

Although the discussion above refers specifically to the substitution of connection strings, the same substitution mechanism may be applied to kinds of data other than connection strings also. For example, database links, file system links, and/or URLs may be automatically substituted in replayed workload units using the techniques described above.

Maintaining Transactional Consistency in Replay

In one embodiment of the invention, among other information that is captured during the recording interval, information about the "transactional environment" for each workload unit is captured and stored in conjunction with that workload unit. Each SQL command may execute in the context of a transactional environment. The transactional environment in which a SQL command executes dictates which database state the SQL command "sees."

For example, in a transactional database system, client 104A might issue, to production database server 108, SQL commands in the context of a first transaction at the same time that client 104B issues, to production database server 108, SQL commands in the context of a second transaction. The first transaction might include an SQL command, "INSERT INTO T1 VALUES ('A')." The second transaction might include an SQL command, "SELECT*FROM T1." This "SELECT" command might execute after the "INSERT" command has been executed. Under such circumstances, the "SELECT" command in the second transaction should not see the insertion of the value "A" into table "T1" unless the first transaction has been committed. If the "SELECT" command executes before the first transaction has been committed, then the "SELECT" statement should not see the first transaction's effects on table "T1."

To ensure that no transaction should see the effects of another transaction that has not yet committed, an SCN is assigned to each workload unit. For example, an SCN may be assigned to each SQL command. Each SCN reflects the transaction environment in whose context the corresponding workload unit should be processed. In one sense, each SCN signifies a "snapshot" of the database state. An SCN is a "logical time value" that reflects the state of the database that should be visible to the corresponding command when that command is executed or otherwise processed. In one embodiment of the invention, higher SCNs indicate later-occurring database states than are indicated by the lower SCNs that precede them. However, it is possible for multiple workload units to have the same SCNs.

In one embodiment of the invention, these SCNs are included in the workload that is captured by capture processes 110A-N and stored in captured workload 114. When replay drivers 116A-N replay captured workload 114 to test database server 118, test database server 118 uses the SCNs contained within the workload to ensure transactional consistency. Referring to the example discussed above, if the "SELECT" command of the second transaction was unable to see the effects of the first transaction when the "SELECT" command was executed relative to production database server 108, then the presence of the SCNs in the replayed workload causes test database server 118 to ensure that the "SELECT" command also will be unable to see the effects of the first transaction when the "SELECT" command is executed relative to test database server 118. When test database server 118 receives a workload unit that is associated with an SCN, test database server 118 abides by the SCN that is indicated in that workload unit instead of assigning a new SCN to that workload unit.

Although the above description refers to the user of SCNs specifically, various embodiments of the invention may, alternatively, utilize other kinds of transaction environment identifiers whose function and purpose is to represent database state and to ensure transactional consistency between multiple concurrently executing transactions.

In one embodiment of the invention, all workload units are categorized as being either "commit actions" or "non-commit actions." Any workload unit whose execution causes an entire transaction's effects on a database to be made persistent (i.e., "committed") in that database is a commit action. All other workload units are non-commit actions. The results that are obtained from the execution of a non-commit action depend on the commit actions that have been executed prior to that non-commit action.

In one embodiment of the invention, when production database server 108 receives a workload unit, production database server 108 assigns, to that workload unit, the "current" SCN. For example, if the "current" SCN is "90" at the time that production database server 108 receives a workload unit, then the production database server assigns, to that workload unit, an SCN of 90. This is true for both commit and non-commit actions.

However, in one embodiment of the invention, commit actions are associated with two separate SCNs: the "pre-SCN" that is assigned to the commit action when production database server 108 receives the commit action, and another "post-SCN" that is assigned to the commit action when production server 108 finishes executing the commit action. Typically, production database server 108 increases the "current" SCN whenever the production database server finishes executing a commit action. A significant amount of database activity may occur in between the time that production database server 108 receives a particular commit action and the time that the production database server finishes executing that particular commit action. As a result, the "current" SCN that is assigned to the commit action when that commit action is done executing may be higher than the SCN that was assigned to the commit action when production database server 108 receives that action. Thus, a particular commit action's pre-SCN may differ from that particular commit action's post-SCN. In one embodiment of the invention, capture processes 11A-N store, in captured workload 114, both of the SCNs that are assigned to each commit action. The presence of the post-SCN in captured workload 114 allows test database server 118 to determine the value to which the test database server's "current" SCN should be set after the execution, during replay-time, of a commit action with which that post-SCN is associated.

Commit actions are not limited to actual SQL commit statements. Commit actions may include, for example, entire PL/SQL blocks that contain any SQL commit statement. In one embodiment of the invention, a PL/SQL block that contains at least one SQL commit statement is treated as a single commit action. Additionally, data definition ("DDL") statements (e.g., "CREATE TABLE," "DROP TABLE," "ALTER TABLE," etc.) commands are treated as commit actions.

In one embodiment of the invention, the SCNs that are stored in captured workload 114 are used during the pre-processing activities (discussed above) that are performed prior to replay-time. In one embodiment of the invention, a dependency graph, which indicates the order in which various workload units need to be executed relative to each other, is built at pre-processing time based on the SCNs that are associated with those workload units. The dependency graph is considered a part of captured workload 114. The replay system uses this dependency graph during replay-time to ensure that workload units are executed in a transactionally consistent manner.

In one embodiment of the invention, the dependency graph is a directed graph in which separate workload units are represented by separate nodes. Each node in the dependency graph may be connected to one or more other nodes by directional links. Links can be incoming or outgoing. A link incoming to a node indicates that the node's workload unit cannot be executed before the workload unit of the node from which that link comes. A link outgoing from a node indicates that the node's workload unit needs to be executed before the workload unit of the node to which that link goes. In one embodiment of the invention, the dependency graph is constructed in such a way that the use of the graph ensures that, for each commit action represented by a node in the graph, test database server 118 will not execute, before that commit action, any workload unit that has an SCN that is greater than the pre-SCN of that commit action. Thus, when the dependency graph is constructed, each node that represents a workload unit that has an SCN that is greater than the pre-SCN of a particular commit action will be placed somewhere "downstream," link-wise, of the particular commit action's node in the dependency graph. This technique is called "commit point ordering."

In one embodiment of the invention, before test database server 118 executes a particular workload unit during replay time, the test database server consults the dependency graph and determines whether the workload units of all other nodes that are "upstream," link-wise, of the particular workload unit's node in the dependency graph already have been executed relative to test database 120. Test database server 118 does not execute the particular workload unit unless the workload units of all other nodes that are "upstream," link-wise, of the particular workload unit's node in the dependency graph already have been executed relative to test database 120. In one embodiment of the invention, whenever test database server 118 executes a workload unit, the test database server marks that workload unit's node in the dependency graph to indicate that the workload unit has been executed.

In one embodiment of the invention, whenever the test database server's "current" SCN increases during replay-time (e.g., in response to the execution of a commit action by test database server 118), test database server 118 determines, based on a comparison of the "current" SCN with the SCNs of the yet-unexecuted workload units that the test database server has received, which of those workload units the test database server can now execute. In one embodiment of the invention, test database server 118 proceeds to execute each such workload unit that is associated with an SCN that is not greater than the "current" SCN. In one embodiment of the invention, whenever test database server 118 executes a commit action, the test database server sets the "current" SCN to the value of that commit action's post-SCN—the execution of non-commit actions does not cause the test database server to increase the test database server's "current" SCN.

Each workload unit should "see" the proper state of test database 120 when test database server 118 executes that workload unit. For each workload unit, the state of test database 120 that the workload unit should "see" when executed is the state that corresponds to the post-SCN of the commit action represented by the node from which that workload unit's node directly depends in the dependency graph. Therefore, in one embodiment of the invention, whenever test database server 118 is going to execute a non-commit action, test database server 118 first determines the post-SCN of the commit action that is immediately "upstream," link-wise, of that non-commit action. Test database server 118 executes the non-commit action in the context of the database state, or "environment," that is indicated by the post-SCN of that commit action (rather than the SCN of the non-commit action). This ensures that the workload unit will not "see" data that should persistently exist only in some future (relative to the workload unit) database state that the workload unit ought not to be able to "see." The workload unit will not "see" any data that was committed in test database 120 after the immediately "upstream" commit action.

Dependent SCN

When two separate transactions T1 and T2 are concurrently executing relative to production database 112 during capture-time, SQL UPDATE statements in both T1 and T2 might target the same data block in the production database. Under such circumstances, the first transaction whose UPDATE statement is executed (which may depend on the speed of the CPUs that are processing the transactions) obtains a lock on the data block so that the other transaction cannot perform its UPDATE operation until the first transaction has released the lock. The first transaction does not release the lock until the first transaction has committed. Thus, the other transaction will be forced to wait until the first transaction has committed before that other transaction can complete.

After the first transaction has released the lock, the other transaction obtains the lock on the data block, performs its UPDATE operation, and then commits. Under such circumstances, the state of the database after both transactions have committed may depend on the order in which transactions T1 and T2 committed, which is based on the order in which transactions T1 and T2 obtained the lock. When the same transactions T1 and T2 are concurrently replayed relative to test database 120, differences between the production system and the test system might cause the transaction that obtained the lock first during capture-time to obtain the lock last during replay-time. As a result, during replay time, the transactions might commit in a different order than the order in which those transactions committed during capture-time. If no compensation is made for this situation, then the concurrent replay of transactions T1 and T2 might produce significantly different effects relative to test database 120 than the original concurrent execution of those transactions produced relative to production database 112. The authenticity of the replay may be compromised.

In order to overcome the difficulties that such situations might present, in one embodiment of the invention, each workload unit is assigned at least two separate SCNs: a "statement" SCN and a "dependent" SCN. The "statement" SCN is the SCN that is discussed above, which is the production database server's "current" SCN that is assigned at the time that production database server 108 receives the workload unit during capture-time. The "dependent" SCN is the post-SCN of the commit action for whose completion the workload unit had to wait before executing at capture-time, if the workload unit had to wait. Capture processes 11A-N store both SCNs for each workload unit in captured workload 114.

For example, at capture-time, if production database server 108 receives a particular workload unit (e.g., an SQL UPDATE statement) in transaction T2 when the production database server's "current" SCN is "40," then the particular workload unit's "statement" SCN is "40." If the execution of the particular workload unit is forced to wait until a particular commit action in concurrently executing transaction T1 finishes, then the particular workload unit's "dependent" SCN is the post-SCN of the particular commit action. If the particular commit action's post-SCN is "50," then the particular workload unit's "dependent" SCN is also "50." In one embodiment of the invention, during capture-time, whenever the execution of a workload unit is forced to wait for a commit action in another transaction to finish, production database server 108 sets that workload unit's "dependent" SCN to the post-SCN of that commit action at the time that the commit action finishes.

In one embodiment of the invention, each lock identifies the transaction that last released that lock. Thus, when a workload unit obtains a lock after being forced to wait for that lock, that workload unit may determine which other transaction last released the lock, and may determine, from transaction tables, the post-SCN of the commit action that committed that other transaction. However, there are a variety of different techniques through which the correct "dependent" SCN might be determined for a given workload unit; the foregoing is merely an example of one of the many different techniques that might be employed.

A workload unit might need to wait for several different locks to be released (possibly by other workload units in multiple other concurrently executing transactions) before that workload unit can execute. Under such circumstances, the workload unit's "dependent" SCN might be updated several times as the workload unit eventually obtains each of the locks. The workload unit's "dependent" SCN ultimately will contain the value to which the workload unit's "dependent" SCN was last updated, and will reflect the post-SCN of the commit action that finished last among those on which the workload unit's execution was waiting.

In one embodiment of the invention, workload units' "dependent" SCNs are used at replay-time to at least partially determine the order in which test database server 118 should execute those workload units relative to each other. In one embodiment of the invention, during replay-time, whenever test database server 118 receives a workload unit that is associated with a "dependent" SCN, the test database server refrains from executing that workload unit until the test database server's "current" SCN is at least as great as the workload unit's "dependent" SCN. As a result, if production database server 108 committed a first workload unit in transaction T1 before executing a second workload unit in a concurrently executing transaction T2 at capture-time, test database server 118 will not execute the second workload unit at replay-time until after the test database server has committed the first workload unit, even if the test database server receives the second workload unit before the first workload unit. As a result, the authenticity of the replay will be preserved.

Client-Driven Replay

As is discussed above, in one embodiment of the invention, replay drivers 116A-N send workload units that are in captured workload 114 to test database server 118. Thus, test database server 118 may process those workload units in the same manner as test database server 118 would have processed those workload units if they had been sent by applications servers 106A-N and/or clients 104A-N instead. The existence of replay drivers 116A-N makes it unnecessary to duplicate application servers 106A-N and clients 104A-N in the replay system. In one embodiment of the invention, each workload unit that is replayed is equivalent to the original workload unit that was captured in the production system in terms of the way that the workload unit affects database state, end results, and server component usage. In one embodiment of the invention, the temporal characteristics of concurrent workload units are maintained so as to keep the same concurrency relative to test database server 118 and test database 120 during replay.

Replay drivers 116A-N can be deployed easily. In one embodiment of the invention, each of replay drivers 116A-N is implemented identically. For example, each of replay drivers 116A-N may be a separate executing instance of the same program code (whereas, typically, application servers 106A-N will not be similar to each other in this way). The number of replay drivers 116A-N that drive the replay may vary. For example, all of the workload units in captured workload 114 may be replayed by a single replay driver 116A, regardless of the number of applications servers 106A-N and clients 104A-N. Alternatively, each of replay drivers 116A-N may replay the workload units that were originally sent by a corresponding one of application servers 106A-N. There does not need to be a one-to-one correspondence between applications servers 106A-N and replay drivers 116A-N (although there can be). Thus, the replay system is scalable.

The replay is consistent in function, but not necessarily in form, with the original workload processing that occurred at capture-time. In one embodiment of the invention, replay drivers 116A-N read all of the data from captured workload 114 and, using reverse engineering, construct new calls that conform to OCI or a similar protocol. Such reverse engineering may involve, for example, extracting, from a workload unit, SQL text, bind values, SCNs, etc., and placing such information into an OCI call. Thus, the protocol used during replay may be independent of the protocol(s) (e.g., JDBC, ODBC, etc.) that were used by application servers 106A-N at capture-time. In one embodiment of the invention, this protocol exposes all of the available functionality of test database server 118. OCI can be used to reproduce the functionality of the calls of all other protocols. OCI allows non-SQL-based, non-cursor-based direct access to objects (e.g., LOBs) in a database.

In one embodiment of the invention, replay drivers 116A-N divvy replay tasks among themselves. In one embodiment of the invention, replay drivers 116A-N automatically balance the workload unit among themselves so that each replay driver is sending approximately the same amount of data at approximately the same rate to test database server 118 at replay-time.

Each of replay clients 116A-N may be multi-threaded so that replay clients 116A-N can drive multiple "user streams," or "sessions," from which workload was captured during capture time. For example, a separate thread may be devoted to the replay of the workload units from each database session.

In one embodiment of the invention, the quantity of concurrently executing database server instances that perform operations relative to production database 112 differs from the quantity of concurrently executing database server instances that perform operations relative to test database 120. For example, regardless of whether there is one production database server instance or several production database server instances (e.g., as in a RAC), there may be one test database server instance or several test database server instances.

In one embodiment of the invention, captured workload 114 is replayed in such a way that connection patterns between application servers 106A-N and the production database server(s) are recreated between replay drivers 116A-N and the test database server(s). For example, if two or more sessions explicitly used one common connection to production database server 108 at capture-time, then two or more sessions may similarly use one common connection to test database server 118 at replay-time.

Replay drivers 116A-N may execute on the same machine or on separate machines. In one embodiment of the invention, each of replay drivers 116A-N maintains statistics concerning the workload units that the replay driver replays. For example, the statistics may indicate, for each replayed workload unit (e.g., SQL statement), how long it took for that workload unit to be completely replayed (e.g., executed) relative to the replay system. As a result, the database system administrators can compare the performance of the replay/test system to the performance of the capture/production system. For another example, such statistics may indicate, for each replayed workload unit, any error messages that were generated as a consequence of the replaying of that workload unit relative to the test system. Database system administrators may inspect such error messages and use the information gleaned from that inspection to troubleshoot the test system. For another example, such statistics may indicate, for each replayed SQL statement, a number of rows that the SQL statement returned or affected in test database 120. Database system administrators may compare this number of rows with an expected number of rows—such as the number of rows that the same SQL statement returned or affected when that SQL statement was originally processed relative to production database 112—to determine whether the behavior of the replay/test system conforms to expected behavior.

Hardware Overview

Figure 2:
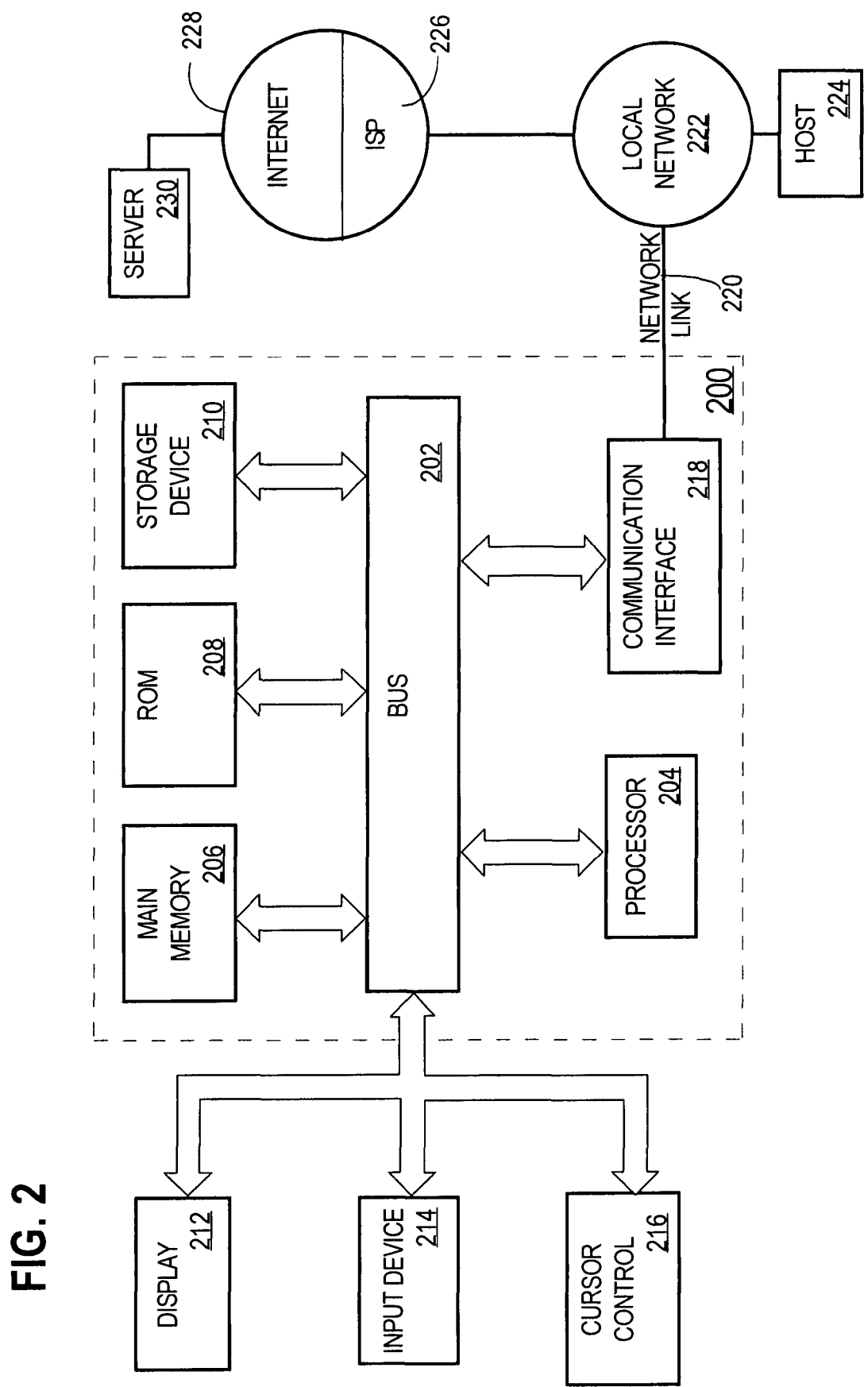
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
a first database server receiving a first command and a second command;
the first database server determining a system change number that reflects a state of a database in which the first command and the second command are processed, wherein the second command is processed by the first database server after the first command in terms of time, and wherein the second command and the first command have the same system change number, wherein the first database server determines other system change numbers for other commands as changes are committed to the database; and
the first database server storing the system change number in association with workload data to enable one or more replay processes to read the workload data and replay the workload data relative to a second database server that is separate from the first database server;
the one or more replay processes reading the first command and the second command from a capture repository;
the one or more replay processes replaying the first command and the second command relative to the second database server; and
the second database server using the system change number to determine a state of a second database that should be visible to the first command and the second command when the first command and the second command are processed by the second database server;
wherein the steps are performed by one or more computing devices.

2. The method of claim 1, wherein the first database server storing the system change number in association with the workload data to enable one or more replay processes to read the workload data and replay the workload data relative to the second database server comprises:
the first database server determining whether the workload data satisfies user-specified filter criteria; and
if a unit of the workload data satisfies the user-specified filter criteria, then the first database server capturing the unit of the workload data by storing one or more aspects of the unit of workload data in a capture repository from which the one or more replay processes read information and replay the information relative to the second database server;
wherein if the unit of workload data does not satisfy the user-specified filter criteria, then the first database server filtering the unit of the workload data by not storing the one or more aspects of the unit of workload data in the capture repository;
wherein a first plurality of units of workload data are captured and a second plurality of units of workload data are not captured as a result of being filtered by the first database server;
wherein the steps are performed by one or more computing devices.

3. The method of claim 2, wherein determining whether the data satisfies the user-specified filter criteria comprises determining whether the data originated from a user-specified entity that sends data to the first database server.

4. The method of claim 2, wherein determining whether the data satisfies the user-specified filter criteria comprises determining whether the data targets a user-specified relational database structure within the first database.

5. A volatile or non-volatile computer-readable storage medium storing one or more sequences of instructions which, when executed by one or more processors, causes the one or more processors to perform a first database server receiving a first command and a second command;

the first database server determining a system change number that reflects a state of a database in which the first command and the second command are processed, wherein the second command is processed by the first database server after the first command in terms of time, and wherein the second command and the first command have the same system change number, wherein the first database server determines other system change numbers for other commands as changes are committed to the database; and the first database server storing the system change number in association with workload data to enable one or more replay processes to read the workload data and replay the workload data relative to a second database server that is separate from the first database server;

the one or more replay processes reading the first command and the second command from a capture repository;

the one or more replay processes replaying the first command and the second command relative to the second database server; and the second database server using the system change number to determine a state of a second database that should be visible to the first command and the second command when the first command and the second command are processed by the second database server.

6. The volatile or non-volatile computer-readable storage medium of claim 5, wherein the one or more sequences of instructions, when executed by the one or more processors cause the first database server storing the system change number in association with the workload data to enable one or more replay processes to read the workload data and replay the workload data relative to the second database server by:

the first database server determining whether the workload data satisfies user-specified filter criteria; and if a unit of the workload data satisfies the user-specified filter criteria, then the first database server capturing the unit of the workload data by storing one or more aspects of the unit of workload data in a capture repository from which the one or more replay processes read information and replay the information relative to the second database server;

wherein if the unit of workload data does not satisfy the user-specified filter criteria, then the first database server filtering the unit of the workload data by not storing the one or more aspects of the unit of workload data in the capture repository;

wherein a first plurality of units of workload data are captured and a second plurality of units of workload data are not captured as a result of being filtered by the first database server.

7. A volatile or non-volatile computer-readable storage medium as recited in claim 6, wherein determining whether the data satisfies the user-specified filter criteria comprises determining whether the data originated from a user-specified entity that sends data to the first database server.

8. A volatile or non-volatile computer-readable storage medium as recited in claim 6, wherein determining whether the data satisfies the user-specified filter criteria comprises determining whether the data targets a user-specified relational database structure within the first database.

9. The method of claim 1, wherein the second command is processed by the second database server before the first command in terms of time.

10. A volatile or non-volatile computer-readable storage medium as recited in claim 5, wherein the second command is processed by the second database server before the first command in terms of time.

11. The method of claim 1, wherein the system change number is a captured system change number, and wherein the second database server using the captured system change number to determine the state of the second database that should be visible to the first command and the second command when the first command and the second command are processed by the second database server comprises the second database server waiting to execute the first command and the second command until after a current system change number in the second database advances beyond the captured system change number.

12. A volatile or non-volatile computer-readable storage medium as recited in claim 5, wherein the system change number is a captured system change number, and wherein the second database server using the captured system change number to determine the state of the second database that should be visible to the first command and the second command when the first command and the second command are processed by the second database server comprises the second database server waiting to execute the first command and the second command until after a current system change number in the second database advances beyond the captured system change number.

13. The method of claim 2, wherein determining whether the data satisfies the user-specified filter criteria comprises determining whether the data originated from a user-specified set of applications servers that send data to the first database server.

14. A volatile or non-volatile computer-readable storage medium as recited in claim 6, wherein determining whether the data satisfies the user-specified filter criteria comprises determining whether the data originated from a user-specified set of applications servers that send data to the first database server.

* * * * *

UNITED STATES PATENT AND TRADEMARK OFFICE
CERTIFICATE OF CORRECTION

| | |
|---|---|
| PATENT NO. | : 7,890,458 B2 |
| APPLICATION NO. | : 11/800239 |
| DATED | : February 15, 2011 |
| INVENTOR(S) | : Dias et al. |

It is certified that error appears in the above-identified patent and that said Letters Patent is hereby corrected as shown below:

In column 17, line 41, delete "14" and insert -- 114 --, therefor.

In column 17, line 42, delete "18" and insert -- 118 --, therefor.

In column 23, line 9, delete "11A" and insert -- 110A --, therefor.

In column 25, line 24, delete "11A" and insert -- 110A --, therefor.

Signed and Sealed this
Eleventh Day of October, 2011

David J. Kappos
*Director of the United States Patent and Trademark Office*